United States Patent [19]

Matsuoka

[11] Patent Number: 5,070,833

[45] Date of Patent: Dec. 10, 1991

[54] HEAT-INSULATING ENGINE WITH SWIRL CHAMBER

[75] Inventor: Hiroshi Matsuoka, Yamato, Japan

[73] Assignee: Isuzu Motors Limited, Tokyo, Japan

[21] Appl. No.: 591,167

[22] Filed: Oct. 1, 1990

[30] Foreign Application Priority Data

Sep. 29, 1989 [JP] Japan .................................. 1-252271

[51] Int. Cl.[5] ...................... F02B 19/14; F02M 45/04
[52] U.S. Cl. .................................... 123/270; 123/275; 123/300
[58] Field of Search ............... 123/261, 270, 271, 273, 123/275, 299, 300, 262, 263, 508, 254

[56] References Cited

U.S. PATENT DOCUMENTS 4,217,871 8/1980 Ohashi et al. ................... 123/299 X
4,733,641 3/1988 Ishida .............................. 123/299 X

FOREIGN PATENT DOCUMENTS 0352058 1/1990 European Pat. Off. .
3442628 5/1986 Fed. Rep. of Germany .

OTHER PUBLICATIONS

"Patent Abstracts of Japan", vol. 10, No. 44, *Diesel Engine*, Isuzu Jidosha K.K., 2/1986.
"Patent Abstracts of Japan", vol. 6, No. 109, *Internal Combustion Engine*, Nippon Jidoushiya Kenkyusho, 6/1982.

Primary Examiner—Tony M. Argenbright
Attorney, Agent, or Firm—Browdy and Neimark

[57] ABSTRACT

In a heat-insulating swirl chamber engine, subsidiary fuel is injected from subsidiary nozzles along the inner wall surfaces of swirl chambers of a heat-insulating structure from the second half of an intake stroke to the first half of a compression stroke, so that a lean mixture formed in the swirl chambers does not diffuse into cylinders, deterioration of hydrocarbon components can be prevented and moreover, since the fuel comes into contact with the wall surfaces of the swirl chambers, heat energy can be recovered from the wall surfaces. Next, main fuel is injected from main nozzles into the swirl chambers from the second half of the compression stroke to the first half of an expansion stroke, so that the inside of the swirl chambers becomes fuel-rich due to the lean mixture formed in advance in the swirl chambers and the fuel by the main injection, combustion is effected in the fuel-rich state to restrict the generation of NOx and moreover, cycle efficiency can be improved because the main combustion period is shortened.

10 Claims, 2 Drawing Sheets

HEAT-INSULATING ENGINE WITH SWIRL CHAMBER

BACKGROUND OF THE INVENTION

1. Field of the Invention

This invention relates to a heat-insulating swirl chamber engine equipped with main nozzles and subsidiary nozzles in swirl chambers.

2. Description of the Prior Art

It is known conventionally that when pre-mixture is sucked to a certain extent and the sucked premixture is compressed and is then injected from nozzles in a Diesel engine, the engine output is improved and the occurrence of smoke or the like is reduced. In this case, since the pre-mixture has an extremely lean mixture ratio and is distributed substantially uniformly throughout the cylinders, the pre-mixture existing near the cylinder wall and in the gap between the top land of a piston head and a cylinder liner is not burnt but is exhausted as an unburnt gas and results in deterioration of hydrocarbon components of a fuel, even after the fuel is injected from ordinary nozzles and burnt.

The structure of a heat-insulating engine utilizing a ceramic material as a heat-insulating material or as a heat-resistant material is disclosed, for example, in Japanese Patent Laid-Open No. 33454/1990. In the heat-insulating piston structure described in this reference, a main combustion chamber composed of a high density ceramic thin sheet and fitted to a cylinder head through a heat-insulating material is allowed to communicate with a subsidiary combustion chamber having a structure wherein its swirl chamber block is made of a material having low thermal conductivity, the inner wall surface of this swirl chamber block is made of a high density ceramic thin sheet and fuel injection nozzles are provided. In this heat-insulating engine structure, moreover, the main combustion chamber comprises a unitary structure of a head lower surface thin sheet made of a high density ceramic and opposing the lower surface of the cylinder head and a liner thin sheet, the liner thin sheet is fitted to the upper part of the cylinder liner made of a material having low thermal conductivity, inlet/outlet passages of the subsidiary combustion chamber are allowed to communicated with openings formed in the head lower surface thin sheet and the portion of the piston head on the main combustion side is composed of a high density ceramic head thin sheet.

In the heat-insulating engine structure disclosed in the above-mentioned Japanese Patent laid-Open No. 33454/1990, the thermal capacity of the ceramic members constituting the wall surfaces of both the main and subsidiary combustion chambers is reduced as much as possible so as to improve suction efficiency of the engine, mixing of the atomized fuel with air is rapidly effected due to the improvement in suction efficiency and moreover, a fuel equivalent ratio is drastically reduced in order to shorten the combustion time in a smoke generation temperature zone, to avoid combustion in the NOx generation temperature zone, to prevent the generation of the smoke and NOx and to prevent deterioration of strength resulting from the reduction of the thickness of the ceramic material.

However, the heat-insulating engine described above involves the problem of how the heat-insulating swirl chamber engine be constituted in order to recover the heat energy from the inner wall of the swirl chambers, to prevent diffusion of the lean mixture into the cylinders, to eliminate deterioration of hydrocarbons, to attain combustion inside the swirl chambers under the fuel-rich state to restrict the occurrence of NOx and to improve cycle efficiency by shortening the main combustion period.

SUMMARY OF THE INVENTION

It is a primary object of the present invention to solve the problems described above and to provide a heat-insulating swirl chamber engine having the construction wherein ceramic material constituting the wall surfaces of the swirl chambers provides a heat-insulating structure, main nozzles and subsidiary nozzles are disposed in the swirl chambers, the fuel is injected first from the subsidiary nozzles and then mainly from the main nozzles so as to deprive sufficiently the wall surfaces of the heat and to cool it and to recover sufficiently the heat energy from the wall surfaces of the swirl chambers, a satisfactorily lean mixture is formed because the period from the subsidiary injection to the main injection is relatively long, the subsidiary injection is effected particularly during the period from the second half of an intake stroke to a compression stroke during which air flows into the swirl chambers, hence the lean mixture stays in the swirl chambers and is prevented from diffusing into the cylinders to eliminate deterioration of hydrocarbons, the main injection can bring the fuel into the rich mixture state in addition to the lean mixture, the formation of NOx can be restricted and moreover, the main combustion period can be shortened and thus cycle efficiency can be improved.

In a heat-insulating swirl chamber engine which is operated sequentially in four-stroke cycle of an intake stroke, a compression stroke, an expansion stroke and an exhaust stroke, it is another object of the present invention to provide a heat-insulating swirl chamber engine which includes swirl chambers having a heat-insulating structure, subsidiary nozzles for effecting subsidiary injection of a fuel from the second half of the intake stroke to the compression stroke along the wall surfaces of the swirl chambers, main nozzles for effecting main injection of the fuel from the second half of the compression stroke to the first half of the expansion stroke following the subsidiary injection, a main fuel injection pump for supplying the fuel to the main nozzles, a subsidiary fuel injection pump for supplying the fuel to the subsidiary nozzles, and rotary motion transmission means for transmitting the rotary motion of a crank shaft for operating the main and subsidiary fuel injection nozzles.

It is still another object of the present invention to provide a heat-insulating swirl chamber engine which includes a main fuel injection pump for supplying a fuel to main nozzles, a subsidiary fuel injection pump for supplying a fuel to subsidiary fuel injection nozzles, flow rate regulation means disposed on the main fuel injection pump, for regulating the flow rate of the fuel injected from the main nozzles in response to a step-on quantity of an acceleration pedal, and flow rate regulation means disposed on the subsidiary fuel injection pump, for regulating the flow rate of the fuel injected from the subsidiary nozzles in response to the step-on quantity of the acceleration pedal, wherein the fuel flow rate to be injected to the swirl chambers can be regulated by only the step-on quantity of the acceleration pedal, the injection characteristics or in other words, the flow rate of the subsidiary injection, increases in response to higher temperature in the swirl chambers at the time of a higher engine load and a higher speed engine revolution, the swirl chambers are cooled, recovery of heat energy becomes vigorous and the engine condition is automatically controlled to an optimum state.

It is still another object of the present invention to provide a heat-insulating swirl chamber engine wherein fuel is injected from subsidiary nozzles along the inner wall surface of swirl chambers from the second half of an intake stroke to a compression stroke so that the inner wall surface of the swirl chambers can be deprived sufficiently of the heat, moreover the subsidiary injection into only the swirl chambers is effected in the compression stroke in which air flows into the swirl chambers, a lean mixture is thus prevented from diffusing into cylinders, and deterioration of hydrocarbon components can be prevented.

In other words, in this heat-insulating swirl chamber engine, although the swirl chambers tend to attain a higher temperature at the time of higher speed and higher load operation of the engine, the fuel is subsidiarily injected from the subsidiary nozzles to the inner wall surfaces of the swirl chamber blocks in contact state and can deprive sufficiently the wall surfaces of the swirl chamber blocks of the heat. The fuel receives the heat, evaporates, recover sufficiently heat energy from the wall surfaces, cools it and improves the fuel economy. Furthermore, there is a relatively long period from the subsidiary injection of the fuel from the subsidiary nozzles to the upper dead point where the explosion stroke or the expansion stroke is initiated and moreover, the subsidiary injection to only the swirl chambers is effected in the compression stroke during which air flows into the swirl chambers. Accordingly, the lean mixture is prevented from diffusing into the cylinders and the whole quantity of the fuel of the subsidiary injection stays in the swirl chambers. For these reasons, the phenomenon in which the mixture stays in the cylinders does not occur and deterioration of hydrocarbons can be eliminated.

It is a further object of the present invention to provide a heat-insulating swirl chamber engine in which fuel is mainly injected from main nozzles into swirl chambers following subsidiary injection from the second half of a compression stroke to the first half of an expansion stroke so as to form a fuel-rich mixture by the fuel of the main injection at the time of main injection combustion from the main nozzles in addition to the lean mixture which is formed in advance by subsidiary injection. Since this fuel-rich mixture is burnt, the formation of NOx can be limited, and moreover, since the lean mixture exists in advance, the main combustion period can be shortened and cycle efficiency can be improved.

DESCRIPTION OF THE PREFERRED EMBODIMENT

A preferred embodiment of the heat-insulating swirl chamber engine in accordance with the present invention will be hereinafter described in further detail with reference to the accompanying drawings.

Figure 1:
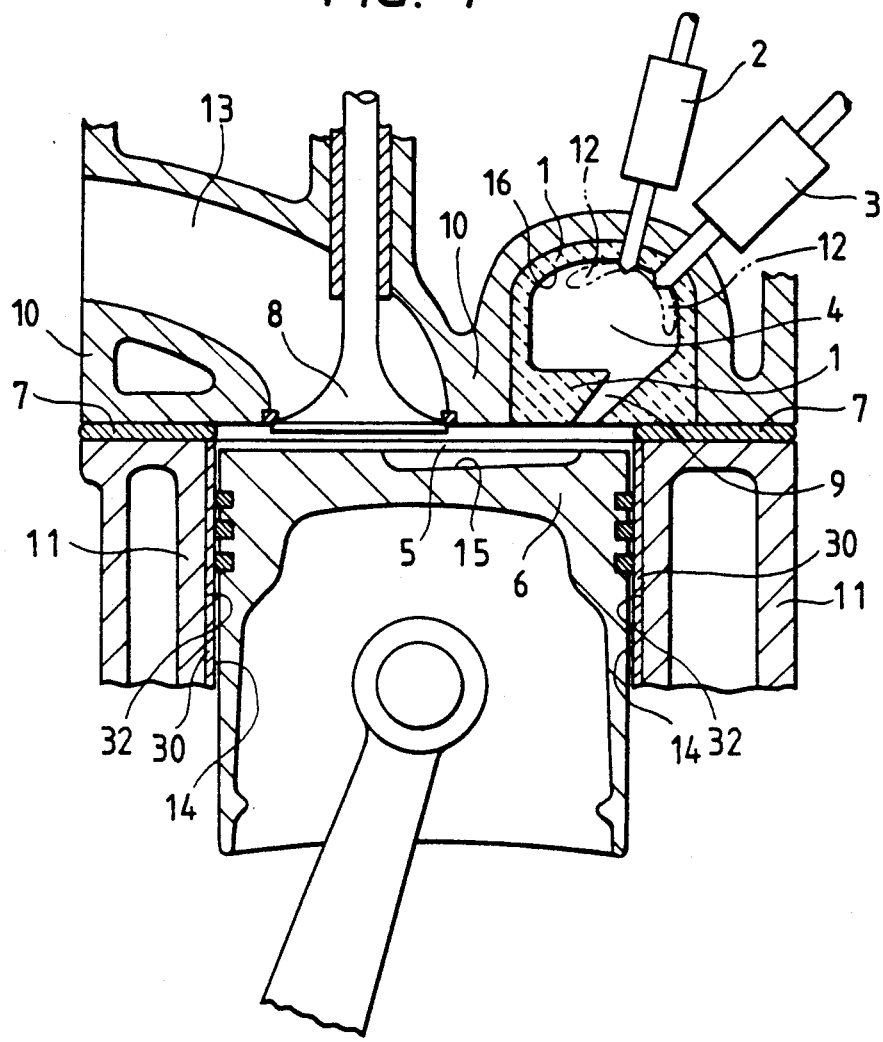
FIG. 1 is a sectional view showing an embodiment of a heat-insulating swirl chamber engine in accordance with the present invention.

FIG. 1 is a schematic sectional view of the heat-insulating swirl chamber engine in accordance with one embodiment of the present invention. This heat-insulating swirl chamber engine is a swirl chamber Diesel engine equipped with swirl chambers 4, whereby the swirl chambers 4 are constituted by swirl chamber blocks 1 made of a ceramic material in a heat-insulating structure and moreover, main nozzles 3 and subsidiary nozzles 2 are disposed in the swirl chambers 4.

This heat-insulating swirl chamber engine includes a cylinder block 11, cylinder liners 30 fitted into holes 32 of the cylinder block 11 and constituting cylinders 14, a cylinder head 10 fixed to the cylinder block 11 through a gasket 7, pistons 6 reciprocating inside the cylinder liners 30 or the cylinders 14, intake/exhaust ports 13 formed in the cylinder head 10, intake/exhaust valves 8 disposed at the intake/exhaust ports 13, swirl chamber blocks 1 disposed in holes 31 formed in the cylinder head 10 and forming the swirl chambers 4 of the heat-insulating structure, main nozzles 3 and subsidiary nozzles 2 disposed in the swirl chambers 4 and main combustion chambers 5 formed inside the cylinders 14. The main combustion chambers 5 communicate with the swirl chambers 4 through communication ports 9 formed in the swirl chamber blocks 1. A recess 15 formed at the piston head of each piston 6 constitutes part of the main combustion chamber 5.

The swirl chamber 4 is composed in a heat-insulating structure by the swirl chamber block 1 made of a ceramic material such as silicon nitride ($Si_3N_4$), silicon carbide (SiC), aluminum titanate, potassium titanate, composite materials.

Figure 2:
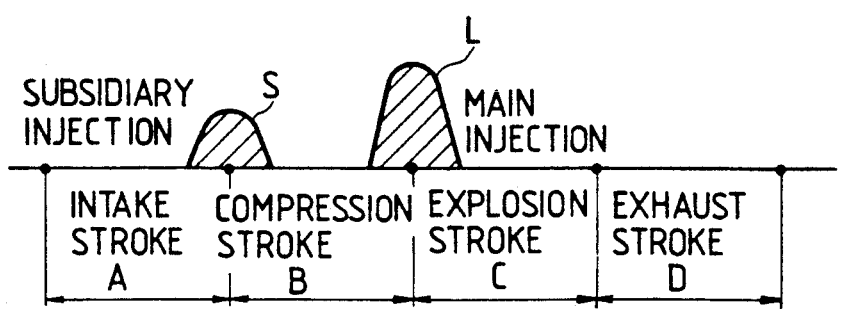
FIG. 2 is an explanatory view showing a fuel injection timing in the heat-insulating swirl chamber engine shown in FIG. 1.

This heat-insulating swirl chamber engine is sequentially operated by the four operation strokes consisting of an intake stroke A, a compression stroke B, an expansion stroke C and an exhaust stroke D as shown in FIG. 2. This heat-insulating swirl chamber engine is particularly characterized in that a small quantity of fuel is subsidiarily injected from the subsidiary nozzles 2 along the inner wall surfaces of the swirl chamber blocks 1 from the second half of the intake stroke A to the first half of the compression stroke B and the main injection of the fuel is made following this subsidiary injection from the main nozzles 3 into the swirl chambers 4 from the second half of the compression stroke B to the first half of the expansion stroke C.

In this swirl chamber heat-insulating engine, a small quantity of the fuel out of the total fuel injection quantity is first injected from the subsidiary nozzles 2 into the swirl chambers 4 and then the major proportion of the total fuel injection quantity are then injected from the main nozzles 3 into the swirl chambers 4. In other words, the fuel flow rate S injected from the subsidiary nozzles 2 into the swirl chambers 4 is from 0 to 30% of the total fuel injection quantity and the fuel flow rate L injected from the main nozzles 3 into the swirl chambers 4 is from 70 to 100% of the total fuel injection quantity. Furthermore, the fuel injection pattern 12 for injecting the fuel from the subsidiary nozzles 2 into the swirl chambers 4 is such that the fuel is injected along the inner wall surfaces 16 of the swirl chamber blocks 1, that is, along the wall surfaces of the swirl chambers 4 in contact with it and heat energy is recovered by evaporation of the fuel from the inner wall surfaces 16 of the swirl chamber blocks 1 constituting the swirl chambers 4 by the injected fuel.

Moreover, the period from the subsidiary injection from the subsidiary nozzles 2 to the main injection from the main nozzles 3 is considerably long, so that a good and lean mixture is generated inside the swirl chambers 4. Particularly because the subsidiary injection is made almost during the period in which air flows into the swirl chambers 4 during the compression stroke, the lean mixture stays inside the swirl chambers 4 and is prevented from diffusing into the main combustion chambers 5 or in other words, into the cylinders 14. Therefore, deterioration of hydrocarbons can be eliminated. In addition to the lean mixture staying inside the swirl chambers 4, the fuel can be converted to the rich mixture by the main injection from the main nozzles 3, the formation of NOx can be prevented and moreover; the main combustion period can be shortened and cycle efficiency can be improved.

Figure 3:
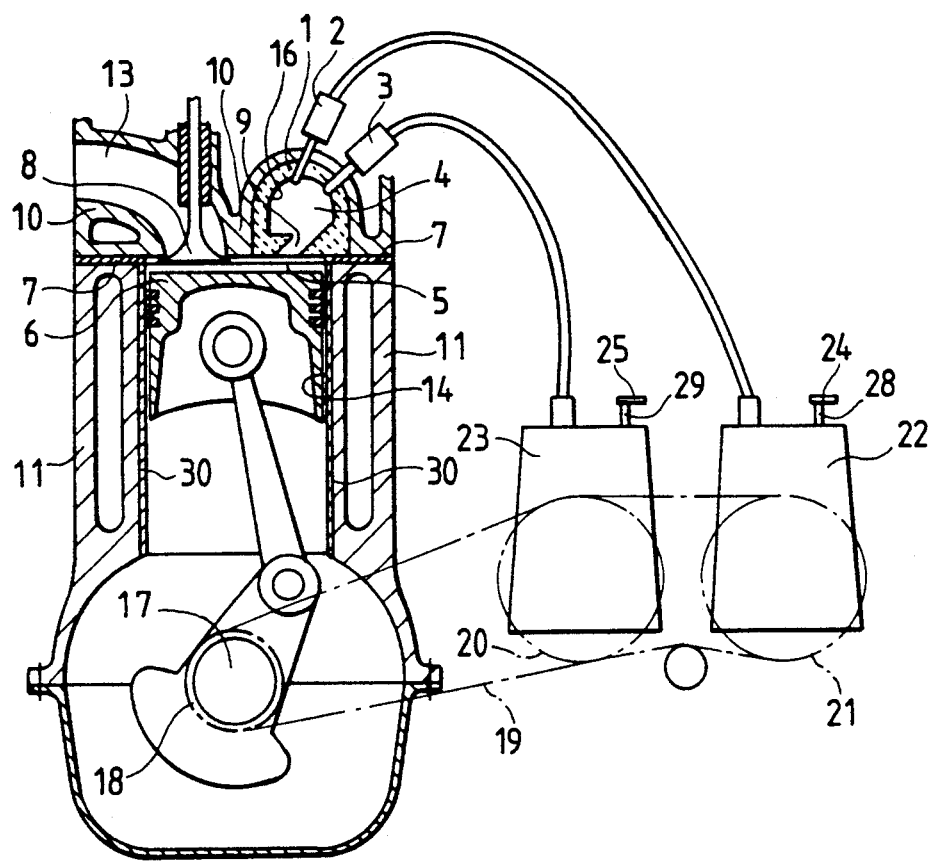
FIG. 3 is a sectional view showing a more detailed example of the heat-insulating swirl chamber engine shown in FIG. 1.
Figure 4:
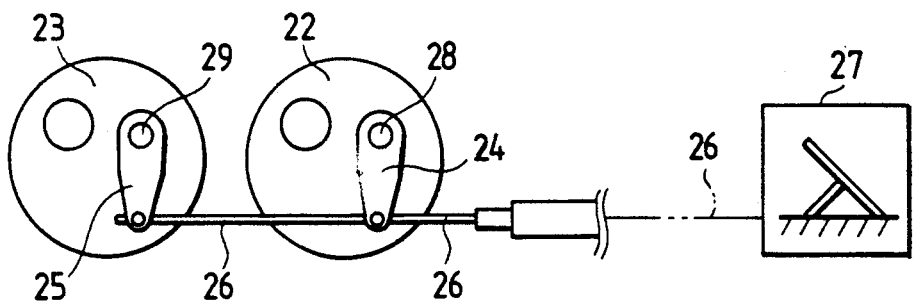
FIG. 4 is an explanatory view showing an example of a mechanism for adjusting fuel flow rates of a main fuel injection pump and a subsidiary fuel injection pump shown in FIG. 3.

Next, the heat-insulating swirl chamber engine in accordance with the present invention will be explained in more detail with reference to FIGS. 3 and 4. This swirl chamber heat-insulating engine is equipped with a main fuel injection pump 23 for supplying the fuel to the main nozzles 3 disposed in the swirl chambers 4 and a subsidiary fuel injection pump 22 for supplying the fuel to the subsidiary nozzles 2 disposed in the swirl chambers 4. A flow rate regulation valve (not shown) for regulating the flow rate of the fuel sent out from the main fuel injection pump 23 to the main nozzles 3 is disposed at the fuel injection port of this main fuel injection pump 23. A flow rate regulation valve (not shown) for regulating the flow rate of the fuel sent out from the subsidiary fuel injection pump 22 to the subsidiary nozzles 2 is disposed at the fuel injection port of the subsidiary fuel injection pump 22.

These flow rate regulation valves are constructed so that their openings can be adjusted by the operation of regulation levers 24 and 25, respectively. These regulation levers 24, 25 are connected to a cable 26 which extends and contracts in response to the step-on quantity of an acceleration pedal 27. Accordingly, when the cable 26 extends or contracts due to step-on of the acceleration pedal 27, the regulation levers 24, 25 rotate regulation shafts 28, 29 of the flow rate regulation valves, respectively. In consequence, the angle of rotation of the regulation shaft 28, 29 of each flow rate regulation valve and the opening of each flow rate regulation valve are adjusted according to the step-on quantity of the pedal 27, and the flow rate of the fuel supplied from the main fuel injection pump 23 to the main nozzles 3 and that from the subsidiary fuel injection pump 22 to the subsidiary nozzles 2 can be regulated.

Furthermore, a pump operation pulley 20 is disposed in the main fuel injection pump 23 and a pump operation pulley 21 is likewise disposed in the subsidiary fuel injection pump 22. These pump operation pullies 20, 21 are connected to, and driven by, a crank pulley 18 which is fitted to the crank shaft 17 and rotates integrally with it, by a timing belt 19. Therefore, the main fuel injection pump 23 and the subsidiary fuel injection pump 22 are driven by the timing belt 19 with the revolution of the engine.

Alternatively, the fuel flow rate control means (not shown) for the flow rates of the fuel injected from the main and subsidiary nozzles 3, 2 can be constituted by an electrical fuel injection nozzle equipped with a needle valve which operates electrically in accordance with an instruction from a controller.

What is claimed is:

1. A heat-insulating swirl chamber engine which includes a cylinder block having cylinders, a cylinder head fitted to said cylinder block, pistons reciprocating inside said cylinders, swirl chamber blocks of a heat-insulating structure disposed inside said cylinder head and swirl chambers formed in said swirl chamber blocks, and which is sequentially operated in four-stroke cycle of an intake stroke, a compression stroke, an expansion stroke and an exhaust stroke;

comprising:

subsidiary nozzles opening injection ports thereof to said swirl chambers and injecting subsidiary fuel to said swirl chambers along the inner wall surfaces of said swirl chamber blocks from the second half of said intake stroke to the first half of said compression stroke; and main nozzles opening injection ports thereof to said swirl chambers and injecting main fuel into said swirl chambers from the second half of said compression stroke to the first half of said expansion stroke.

2. A heat-insulating swirl chamber engine according to claim 1, wherein a small quantity of the fuel out of the total fuel injection quantity is injected from said subsidiary nozzles along the wall surfaces of said swirl chambers and then the major proportion of the total fuel injection quantity is injected into said swirl chambers from said main nozzles.

3. A heat-insulating swirl chamber engine according to claim 1, wherein said swirl chamber blocks are made of a ceramic material.

4. A heat-insulating swirl chamber engine which includes a cylinder block, holes formed in said cylinder block, cylinder liners fitted into said holes, main combustion chambers formed inside said cylinder liners, a cylinder head fitted to said cylinder block, intake/exhaust ports formed in said cylinder head, intake/exhaust valves for opening and closing said intake/exhaust ports, pistons reciprocating inside said cylinder liners, swirl chamber blocks of a heat-insulating structure disposed in said cylinder head, swirl chambers formed in said swirl chamber blocks, and communication ports for communicating said swirl chambers with said main chambers, and which is operated sequentially in four-stroke cycle of an intake stroke, a compression stroke, an expansion stroke and an exhaust stroke;

comprising:

subsidiary nozzles disposed in said cylinder head and opening injection ports thereof to said swirl chambers, said subsidiary nozzles injecting a small quantity of fuel along the wall surfaces of said swirl chambers from the second half of said intake stroke to the first half of said compression stroke; and main nozzles disposed in said cylinder head and opening injection ports thereof to said swirl chambers, said main nozzles injecting the major proportion of the fuel to said swirl chambers from the second half of said compression stroke to the first half of said expansion stroke.

5. A heat-insulating swirl chamber engine which includes a cylinder block having cylinders, a cylinder head fitted to said cylinder block, pistons reciprocating inside said cylinders, swirl chamber blocks of a heat-insulating structure disposed in said cylinder head and swirl chambers formed in said swirl chamber blocks, and which is sequentially operated in four-stroke cycle of an intake stroke, a compression stroke, an expansion stroke and an exhaust stroke;

comprising:
subsidiary nozzles opening injection ports thereof to said swirl chambers and injecting subsidiary fuel along the inner wall surfaces of said subsidiary blocks from the second half of said intake stroke to the first half of said compression stroke;
main nozzles opening injection ports thereof to said swirl chambers and injecting main fuel to said swirl chambers from the second half of said compression stroke to the first half of said expansion stroke;
a subsidiary fuel injection pump for supplying the fuel to said subsidiary nozzles;
a main fuel injection pump for supplying the fuel to said main nozzles;
flow rate regulation means for regulating the flow rate of the fuel to be injected from said subsidiary nozzles in response to an engine load, disposed on said subsidiary fuel injection pump; and
flow rate regulation means for regulating the flow rate of the fuel to be injected from said main nozzle in response to the engine load, disposed on said main fuel injection pump.

6. A heat-insulating swirl chamber engine according to claim 5, wherein said engine load is detected by a step-on quantity of an acceleration pedal.

7. A heat-insulating swirl chamber engine according to claim 6, wherein said flow rate regulation means disposed in said main fuel injection pump includes a throttle lever for regulating a fuel injection quantity of said main fuel injection pump and a cable for regulating the opening of said throttle lever in response to the step-on quantity of said acceleration lever.

8. A heat-insulating swirl chamber engine according to claim 6, wherein said flow rate regulation means disposed in said subsidiary fuel injection pump includes a throttle lever for regulating the fuel injection quantity of said subsidiary fuel injection pump and a cable for regulating the opening of said throttle lever in response to the step-on quantity of said acceleration lever.

9. A heat-insulating swirl chamber engine which includes a cylinder block having cylinders, a cylinder head fitted to said cylinder block, pistons reciprocating inside said cylinders, crank shafts for reciprocating said pistons inside said cylinders, swirl chamber blocks of a heat-insulating structure disposed in said cylinder head and swirl chambers formed in said swirl chamber blocks, and which is sequentially operated in four-stroke cycle of an intake stroke, a compression stroke, an expansion stroke and an intake stroke;

comprising:
subsidiary nozzles opening injection ports thereof to said swirl chambers and injecting subsidiary a fuel along the wall surface of said swirl chambers from the second half of said intake stroke to said compression stroke;
main nozzles opening injection ports thereof to said swirl chambers and injecting main fuel to said swirl chambers from the second half of said compression stroke to the first half of said expansion stroke following said subsidiary injection;
a subsidiary fuel injection pump for supplying the fuel to said subsidiary nozzles;
a main fuel injection pump for supplying the fuel to said main nozzles; and
rotary motion transmission means for transmitting the rotary motion of said crank shaft in order to operate said main fuel injection pump and said subsidiary fuel injection pump.

10. A heat-insulating swirl chamber engine according to claim 9, wherein said rotary motion transmission means includes a crank pulley fitted to said crank shaft, a pump operation pulley for operating said main fuel injection pump, a pump operation pulley for operating said subsidiary fuel injection pump and a timing belt for transmitting the rotary motion of said crank pulley to each of said pump operation pullies.

* * * * *